United States Patent [19]

Mendez

[11] 4,305,600

[45] Dec. 15, 1981

[54] TWO-WHEEL MAN-POWERED VEHICLE

[76] Inventor: Julian Mendez, 1221 Congreso, 1706 Haedo, Buenos Aires, Argentina

[21] Appl. No.: 24,995

[22] Filed: Mar. 29, 1979

[30] Foreign Application Priority Data

Apr. 5, 1978 [AR] Argentina ............................... 271689
Jun. 9, 1978 [AR] Argentina ............................... 272519

[51] Int. Cl.³ .............................................. B62M 1/16
[52] U.S. Cl. ............................... 280/226 R; 280/240; 280/243
[58] Field of Search ........... 280/240, 220, 221, 226 R, 280/243

[56] References Cited

U.S. PATENT DOCUMENTS

| 348,619 | 9/1886 | Courtney | 280/220 |
| 516,786 | 3/1894 | Clark | 280/240 |
| 642,544 | 1/1900 | Burbank | 280/220 |
| 697,104 | 4/1902 | Pietsch | 280/220 |
| 749,153 | 1/1904 | Batchelor | 280/240 |
| 1,359,957 | 11/1920 | Bolen | 280/243 |

FOREIGN PATENT DOCUMENTS

| 2426011 | 12/1975 | Fed. Rep. of Germany . |
| 494150 | 8/1919 | France . |
| 551367 | 4/1923 | France . |
| 769594 | 8/1934 | France . |
| 775833 | 1/1935 | France . |
| 890589 | 2/1944 | France . |
| 918314 | 2/1947 | France . |
| 995546 | 12/1951 | France . |
| 58550 | 1/1954 | France . |
| 53620 | 12/1942 | Netherlands . |
| 344019 | 2/1960 | Switzerland . |
| 440132 | 12/1935 | United Kingdom . |
| 456498 | 11/1936 | United Kingdom . |
| 602965 | 6/1948 | United Kingdom . |
| 1413844 | 11/1975 | United Kingdom . |
| 1469363 | 4/1977 | United Kingdom . |

*Primary Examiner*—John P. Silverstrim
*Attorney, Agent, or Firm*—Fleit & Jacobson

[57] ABSTRACT

A two-wheel man-powered vehicle having a frame, a steerable front wheel and a rear wheel, both rotatably mounted on the frame. A hand operable power lever has a lower end pivotally mounted on the frame so as to be capable of swinging back and forth in a vertical plane passing through the frame. The lever is constructed in such manner that an upper portion is capable of rotating about its own longitudinal axis. The power lever is provided with a handle at its upper end. A seat for an operator of the vehicle is mounted on the frame so as to be movable back and forth with regard thereto. A flexible transmission mechanism has one end connected to the power lever and one end connected to one of the wheels through a unidirectional drive. The front wheel is connected to the rotatable portion of the power lever by flexible connecting cables so as to be steerable upon rotation of the power lever about its longitudinal axis. A first resilient spring urges backwardly the power lever, and a second resilient spring urges backwardly the operator's seat.

14 Claims, 2 Drawing Figures

TWO-WHEEL MAN-POWERED VEHICLE

BACKGROUND OF THE INVENTION

1. Field of the Invention

This invention relates in general to a two-wheel man-powered vehicle, and more particularly to a vehicle of this kind which is drivable by means of a vertical power lever and flexible transmission means and having a front wheel which is steerable upon rotation of said vertical power lever about its own vertical axis, and having an operator's seat arrangement capable of moving back and forth with regard to the frame of the vehicle.

This new two-wheel vehicle is operable by the rider in a manner very similar to a rowing boat. This is a very desirable characteristic, since it is known that the exercise performed by a human being when rowing a boat of the sporting type is a very complete exercise during which most of the main muscles of the body will make a combined effort and thus are exercised.

2. Description of the Prior Art

Considered in general terms, several different constructions of such a vehicle are already known. However, each of said known embodiments has its own and characteristic disadvantages. The known type of vehicles of this kind have all a point in common, which is the use of a hand lever which may be swung back and forth in the same plane as the general vertical longitudinal plane of the vehicle, a string, cable, chain or other flexible transmission means being connected at one end to said hand lever and at its other end to unidirectional driving means associated with one of the wheels (normally the rear wheel). Thus the swinging back and forth movement of the hand lever is first converted to a linear back and forth movement of the flexible transmission means and then to a rotation movement of the driven wheel. In other embodiments only one end of the flexible transmission means is connected to the hand-lever, the flexible means passing over said unidirectional driving means, and the other end of the flexible means being connected to a fixed point of the frame of the vehicle through an extensible spring. In still another embodiment, the back and forth swinging movement imparted to the hand lever is converted to a rotating movement of the wheel by means of a crank and connecting rod mechanism. Each of these known vehicles has its own drawbacks.

SUMMARY OF THE INVENTION

The two-wheel man-powered vehicle of the present invention is of an entirely new form of construction which provides better stability of the vehicle, greater speed which is attainable by the same muscular effort exerted by the driver, easy steering, use of all the main muscles of legs, arms, shoulders, back, waist and others, the main effort is exerted in a continuous manner during the entire backward stroke of the hand lever, and it offers great facility of learning to ride it.

According to a presently preferred embodiment, the vehicle of this invention comprises a frame including a lower portion projecting forwardly in a frame front portion, and rearwardly in a frame rear portion projecting upwardly with respect to said lower portion, a seat-mounting column pivotally mounted on said frame lower portion, a seat for the driver being provided on the upper end of said column, a hand lever pivotally mounted at its lower end on said frame lower portion and having an actuating handle provided at its upper end, both said seat-mounting column and hand lever being capable of independent back and forth movements in the same plane as the general vertical longitudinal plane defined by the frame, a front wheel fork member the upper end of which is rotatably mounted in said frame, a front wheel being rotatably mounted in said fork member, said hand lever being also capable of rotating about its own longitudinal axis and having flexible means actuatingly connecting it with said front wheel fork member so that any rotating movement of said hand lever about its own longitudinal axis will produce a corresponding rotating movement of said fork member, spring means connecting said hand lever with a fixed point of said frame rear portion and urging said hand lever towards said frame rear portion, spring means urging said seat-mounting column also towards said frame rear portion and capable of limiting the maximum forward tilt of said seat-mounting column, a rear wheel rotatably mounted on said frame rear portion, a flexible transmission member having one end connected to a point of said hand lever said point being located substantially between its medium portion and its upper end, then passing over a pulley freely rotatably mounted in the forward end of the frame front portion, then running backwards and its other end being fixed to a free-wheel rewinding device in which the rear wheel axle is mounted and being urged by spring means to rotate in the direction of rotation in which the flexible transmission member is rewound onto said free-wheel device, and a foot rest mounted on said frame front portion.

According to a more sophisticated embodiment, the length or height of one or both of the hand lever and seat-mounting column is adjustable, to better adapt them to the physical characteristics of the operator. Conveniently, the seat proper may have an anatomic contour with the back rest forming a substantially backward angle of about 45° with regard to the vertical, while the forward end of the seat is smoothly and progressively upwardly curved. This facilitates the forward and backward movement of the body of the operator together with the seat and its mounting column.

Another optional feature is that the foot rest may be made longitudinally adjustable along said frame front portion.

Still another optional feature is that the point of fixation of said flexible transmission member to said hand lever may be made variable along the length of the said hand lever, to so provide means for selectively varying the power transmission ratio of the mechanism. When the point of fixation is established at a low point, the operator will exert more power with the same muscular effort, which may prove to be useful when ascending a hill or when starting the movement of the vehicle; when it is established at a higher point, the operator will be able to develop higher speeds with the same muscular effort.

Another optional feature is that the frame may be made foldable by the provision of hinge means provided in said frame lower portion.

Thus a general object of this invention is to provide a two-wheel man-powered vehicle.

Another object is to provide a vehicle of the kind mentioned which allows the operator to use and exercise most of the main muscles of his body when he exerts the effort necessary to drive the vehicle.

Another object of this invention is to provide a vehicle of the kind mentioned which offers high stability and which is easily steerable.

Another object is to provide a vehicle of the kind mentioned which allows the development of a higher speed for a certain muscular effort exerted by the operator, with regard to the speed attainable with other known vehicles of a similar type.

Another object is to provide a vehicle of the kind mentioned which may be manufactured more easily and at a lesser cost than other known vehicles of a similar type.

Another object is to provide a vehicle of the kind mentioned which offers to the operator a high degree of comfort and safety.

These and other objects and advantages are achieved by the present invention which provides a two-wheel man-powered vehicle comprising a frame having a frame lower portion extending forwardly in a frame front portion and backwardly in a frame rear portion, this later diverging with regard to said frame lower portion, a steerable fork member journalled in said frame front portion, a front wheel rotatably supported by said fork member, a rear wheel rotatably supported by said frame rear portion, a hand operable power lever pivoted to said frame lower portion and capable of defining an arcuate path located in a vertical plane passing substantially through said frame, said path having a front end at which said power lever enters in abutting relationship with a stop forming part of said frame front portion, and a rear end, said power lever defining a longitudinal axis, said power lever being rotatable about said longitudinal axis, a movable seat arrangement located between said hand operable power lever and said rear wheel and movable within said vertical plane, resilient means connected between said frame and said power lever for urging said power lever to a position intermediate said front and rear end of said arcuate path and being changeable upon swinging said power lever towards said front end of said arcuate path, said frame front portion having a free end portion, a flexible transmission member connected to said power lever and to said rear wheel through unidirectional drive means, guide means supported by said free end portion of said frame front portion, said flexible transmission member being guided by said guide means, a pair of diametrically opposite projecting members integral with said power lever, perpendicular to said longitudinal axis and located between the connection of the flexible transmission member to said power lever and its pivot point, and normally stationary foot rest means mounted on said frame front portion in the vecinity of the journal point of said fork member.

The invention will be better understood through the following description of a presently preferred embodiment and the accompanying drawings.

DETAILED DESCRIPTION OF THE PREFERRED EMBODIMENT OF THE INVENTION

Figure 1:
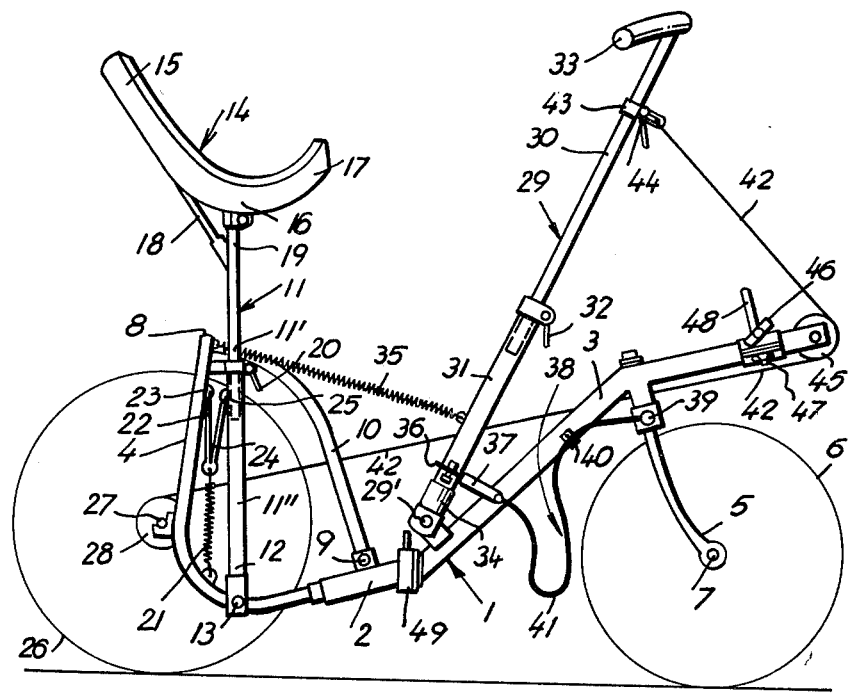
FIG. 1 is a somewhat schematic side elevation view of the two-wheel man-powered vehicle of the present invention.

Referring now to FIG. 1 of the drawings, it can be seen that the vehicle of the present invention comprises a frame indicated in general at 1, the frame having a frame lower portion 2 which extends forwardly in a frame front portion 3 and backwardly in a frame rear fork portion 4, this later diverging in general upwardly with regard to said frame lower portion. A steerable fork member 5 is journalled in said frame front portion, a front wheel 6 being rotatably mounted at 7 in the lower end of said fork member 5. The upper end 8 of said frame rear portion 4 is connected to an intermediate point 9 of the frame lower portion 2 by means of a bracing member 10. A seat-mounting column 11 is pivotally mounted at its lower end 12 on the frame lower portion 2 at a point 13 rearwardly located on said portion 2. On the upper end of column 11 there is fixedly mounted an operator's seat 14 which comprises a straight back-rest portion 15 which projects upwardly at an angle of about 45° with regard to the bottom portion 16, and a front portion 17 which projects in general forwardly, curving smoothly upwards. The seat may have a bracing member 18 connected to the column 11 near its upper end 19. The seat-mounting column 11 comprises two downwardly projecting arms only one of which is visible on FIG. 1, each being formed by two telescopically fitted portions, that is to say an upper portion 11' and a lower portion 11'', the first one fitting into the second (or viceversa) and there being provided, on each of said telescopic arms, conventional means 20 capable of fixing the telescopic relationship between both portions to maintain any desired height of the seat-mounting column. Helical resilient means 21 have one end connected to the lower end of the frame rear portion 4. The other end of the resilient means 21 is connected to one end of a first linkage member 22 the other end of which is anchored on a fixed point 23 near the upper end of frame rear portion 4; said other end of the resilient means 21 is also connected to one end of a second linkage member 24 the other end of which is anchored on a fixed point 25 of the seat-mounting column 11. Thus, while the column 11 may be swung forwardly, its maximum forward tilt will be limited by the length of the two linkage members 22 and 24 extending along one and the same horizontal line with the resilient means 21 being in its extended position.

A rear wheel 26 is rotatably supported at 27 in the frame rear fork portion 4. The shaft of the rear wheel 26 has fixedly associated therewith a free-wheel device 28 which comprises a drum member or the like on which a flexible transmission member (such as a cable, a cord, a chain or the like, which will be described later on) may be wound. The free-wheel device may be of any type of construction already known in the art, in which the drum member is continuously urged (by spring means, not illustrated) to rotate in a direction opposite to that in which the rear wheel rotates during the normal forward run of the vehicle.

A hand-operable power lever indicated in general at 29 is pivotally mounted at a point 29' of the frame lower portion comprising an upper portion 30 and a lower portion 31, one telescopically fitting within the other. There are provided conventional means 32, similar to the means 20 of the seat-mounting column 11, for fixing the telescopic relationship between both portions 30 and 31 to fixedly maintain any desired height of the power lever 29. The lever 29 is provided at its upper end with a transverse handle 33, and its lower end is mounted within a short hollow carrying portion 34 within which it is rotatable about the general longitudinal axis of the power lever. Spring means 35 are provided between power lever 29 and upper end 8 of the frame rear portion 4, the spring means 35 being capable of urging said power lever 29 toward its most backward position.

On the lower end of the lower portion 31 of the power lever, just before it enters into carrying portion 34, there are fixedly two laterally projecting arms of which only one 36 is visible on FIG. 1. To each arm 36 is connected one end of the inner component of a corresponding Bowden transmission cable 38. The other end of each of said inner components is connected to a respective arm of a cross-member 39 the arms of which project radially from each side of the upper portion of the fork member 5 carrying the front wheel. The external cover component of each Bowden cable 38 is anchored to the frame 1 at a corresponding fixed point 40 and to one of the ends of a small fork member 37 which is fixedly mounted on the hollow carrying portion 34. Between the points of fixation 40 and the corresponding ends of the fork member 37, each Bowden cable forms a loop 41. The loop 41 allows to freely take up the back and forth movement of power lever 29 without affecting the steering effect of the Bowden cable which is only effective upon rotation of said power lever 29 about its own longitudinal axis.

The vehicle is provided with a flexible transmission member 42 which may be a metallic cable or string, a cord, a chain or the like. This flexible transmission member 42 has one of its ends connected to a cleat member 43 fitting on the upper portion 31 of power lever 29 so as to be slidable therealong and capable of being fixed by the operator at any desired point along said upper portion 30 by conventional means such as those shown at 44. The other end of the flexible transmission member 42 is anchored at the drum of the free-wheel device 28 so as to be windable thereon under the urging of its internally provided spring (not shown) when the power lever 29 is pushed forwardly by the operator. From its fixing point 44 at power lever 29, the flexible transmission member 42 first runs forwardly passing around a cable pulley 45 freely rotatably mounted at the forward free end of the frame front portion 3, then running backwards until reaching the free-wheel device 28.

A double foot-rest 46 is mounted on the frame front portion 3, on which the operator can rest its feet making it easier for him to exert the necessary effort when he pulls backwards the power lever 29. If desired, the foot-rest may be made slidably adjustable along the frame front portion 3, and is fixable thereon in any desired position by conventional fixing means like those shown at 47. Optionally it may also be provided with guard members 48 projecting horizontally above each foot-rest so as to make it more easy for the operator to maintain its feet on the corresponding foot-rests.

Another optional characteristic of a vehicle constructed according to the present invention is to make its frame foldable on itself. Therefor the frame lower portion 2 may be divided in two sections pivotally coupled together by hinge means like the one indicated at 49 in FIG. 1. The vehicle may thus be folded upon itself by rotating backwardly its front section about a vertical axis defined by the hinge means 49, until said front section abuts flatly against the rear section.

Figure 2:
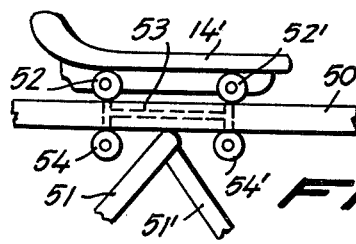
FIG. 2 is a purely schematic side elevation view of another embodiment of the movable seat arrangement of the vehicle.

On FIG. 2 may be seen another embodiment of a movable seat arrangement. According to this embodiment, the frame of the vehicle has two parallel upper frame members 50 (only one of which is visible in FIG. 2) connecting together the upper end 8 of the frame rear portion 4 and the frame front portion 3, and reinforced by corresponding brace members 51 and 51' the lower ends of which are connected to the frame lower portion or to any other convenient points of frame 1. The rear end of each upper frame member 50 projects rearwardly from the upper end 8 of the frame rear portion 4. On these upper frame members is mounted and operator's seat 14', each side of which is provided with a pair of small lateral upper wheels 52 and 52', each pair being capable of running longitudinally upon the upper surface of a corresponding one of said upper frame members 50.

Seat 14' is provided with a downwardly projecting support 53 which passes between both upper frame members 50 and supporting on its lower portion another two pair of small lateral lower wheels 54 and 54', each pair being capable of running along the lower surface of a corresponding one of said upper frame members 50. Each upper frame member may be provided with corresponding front and rear stops (not shown) located on the corresponding member 50 at points corresponding to the front and rear limits of travel desired for seat 14'.

The skilled in this art may introduce certain minor changes into the embodiments described and illustrated. However such changes and modifications will be comprised within the true spirit and scope of the invention which are defined in the claims.

I claim:

1. An occupant-propelled vehicle comprising:
   a frame having front and rear portions;
   a rear wheel;
   unidirection drive means for rotatably mounting said rear wheel on said frame and for driving said rear wheel in one direction only;
   a front wheel;
   means for rotatably mounting said front wheel on the front portion of said frame for steering movement about a generally upright steering axis;
   lever means graspable by the occupant of the vehicle, said lever means including a lower carrying portion connected to said frame for pivotal movement about a first axis transverse to said frame whereby said lever means is movable in an arcuate path forwardly and rearwardly, and an upper lever portion carried by and rotatable with respect to said lower carrying portion;
   steering means connected between said upper lever portion and said means for rotatably mounting said front wheel for rotating said front wheel about said steering axis in response to rotation of said upper lever portion;
   transmission means connected between said lever means and said unidirection drive means for driving said drive means in response to movement of said lever means about said first transverse axis;
   seat means for supporting the occupant; and
   interconnecting means for interconnecting said seat means with said frame so that said seat means is movable in an arcuate path about a second axis parallel to and spaced from said first axis whereby said seat means is movable in an arcuate path spaced from the arcuate path followed by said lever means.

2. An occupant-propelled vehicle, according to claim 1, wherein said rear portion of said frame has a lower portion and an upper portion extending rearwardly from the lower portion, and wherein said interconnecting means comprises a seat-mounting column pivotally mounted at its lower end on the lower portion of said rear portion backwardly with regard to the point at which said lower carrying portion is connected to said frame, spring means having one end anchored to said frame, two linkage members having pivotally connected confronting ends, an outer end of a first one of said linkage members being connected to said rear portion of said frame near an upper end thereof, an outer end of a second one of said linkage members being connected to said seat-mounting column, said spring means having another end connected to the confronting ends of said two linkage members, said seat means being mounted on an upper end of said seat-mounting column.

3. An occupant-propelled vehicle, according to claim 1 or 2, wherein said seat means has a substantially flat bottom portion which backwardly projects into a back portion upwardly diverging substantially 45° with regard to said flat bottom portion, and which forwardly projects into a front portion which is smoothly curved upwardly.

4. An occupant-propelled vehicle, according to claim 2, wherein said seat-mounting column and said lever means each comprises two portions telescopically slidable one within the other, and each of said column and said lever means being provided with means for adjustably fixing one of said telescopically slidable portions with regard to the other.

5. An occupant-propelled vehicle, according to claim 2, wherein said rear portion of said frame comprises two fork arms extending rearwardly and upwardly, said rear wheel being rotatably mounted between the fork arms, said seat-mounting column being fork-shaped and comprising two downwardly projecting telescopically adjustable arms, a lower end of each arm being pivotally mounted on a corresponding one of the fork arms of the frame rear portion.

6. An occupant-propelled vehicle, according to claim 1, wherein said frame is foldable upon itself, the frame having a lower portion divided into a front subportion, a rear subportion, and hinge means for connecting the subportions together.

7. An occupant-propelled vehicle, according to claim 1, wherein said transmission means comprises a flexible transmission member extending between said lever means and said unidirection drive means, and wherein said unidirection drive means for driving the rear wheel includes a drum member on which said flexible transmission member is windable, said drum member having resilient means rotatably urging the drum member in a direction of rotation, independently from the axis of the rear wheel, opposite to the direction of rotation of the rear wheel during normal forward travel of the vehicle, when said lever means is pushed forwardly by the occupant of the vehicle, and said drum member driving said rear wheel in the opposite direction of rotation when said lever means is pulled backwardly by the occupant.

8. An occupant-propelled vehicle, according to claim 1, wherein said transmission means comprises a flexible transmission member extending between said lever means and said unidirection drive means, and means for adjustably fixing a position of connection of said flexible transmission member along said lever means.

9. An occupant-propelled vehicle, according to claim 1, further comprising means for defining a foot rest means adjustably slidable along said front portion of said frame.

10. An occupant-propelled vehicle according to claim 1, wherein said means for rotatably mounting said front wheel comprises fork arms having lower ends connected to the front wheel and a cross-member connecting upper ends of the fork arms, the grass-member having arms projecting outwardly on both sides of the front wheel, wherein laterally projecting arms are fixed to a lower end portion of the upper lever portion of said lever means, and wherein said steering means comprises first and second fork members connected to the lower end portion of the upper lever portion of said lever means and first and second Bowden transmission cables, inner components of the cables having first ends connected to arms of said cross-member and second ends connected to corresponding ones of said arms fixed to said lever means, outer components of the cables having first ends connected to said front portion of said frame and second ends connected to respective ones of said fork arms, each cable forming a loop between the points of fixation of its outer component for taking up back and forth movement of the lever means so that steering is effective only upon rotation of the upper lever portion of the lever means.

11. An occupant-propelled vehicle according to claim 10, wherein said lower carrying portion of said lever means is formed as a hollow member having a lower end pivotally connected to said frame, said upper lever portion of said lever means having its lower end inserted into the hollow member so that the upper portion is rotatable about a longitudinal axis thereof.

12. An occupant-propelled vehicle according to claim 1, wherein said rear portion of said frame has a rearmost portion extending upwardly, and wherein said vehicle further comprises spring means extending downwardly between an upper portion of said rear frame portion and said lever means for urging said lever means towards said rearmost portion.

13. An occupant-propelled vehicle according to claim 1, wherein said lower carrying portion of said lever means comprises a hollow tubular member having a lower end pivotally connected to said frame for movement about said first transverse axis, and wherein said upper lever portion comprises a lower power portion rotatably mounted within said hollow tubular member and a power lever telescopically received in said lower power portion.

14. An occupant-propelled vehicle according to claim 1, wherein said transmission means comprises:
a flexible transmission member extending between an upper part of said upper lever portion and said unidirection drive means; and
guide means connected to said frame at a region spaced forward to said pivot means for guiding movement of said flexible transmission member during movement of said lever means.

* * * * *